(No Model.) 5 Sheets—Sheet 1.
E. A. DOBBINS.
CASH INDICATOR AND RECORDER.
No. 456,287. Patented July 21, 1891.
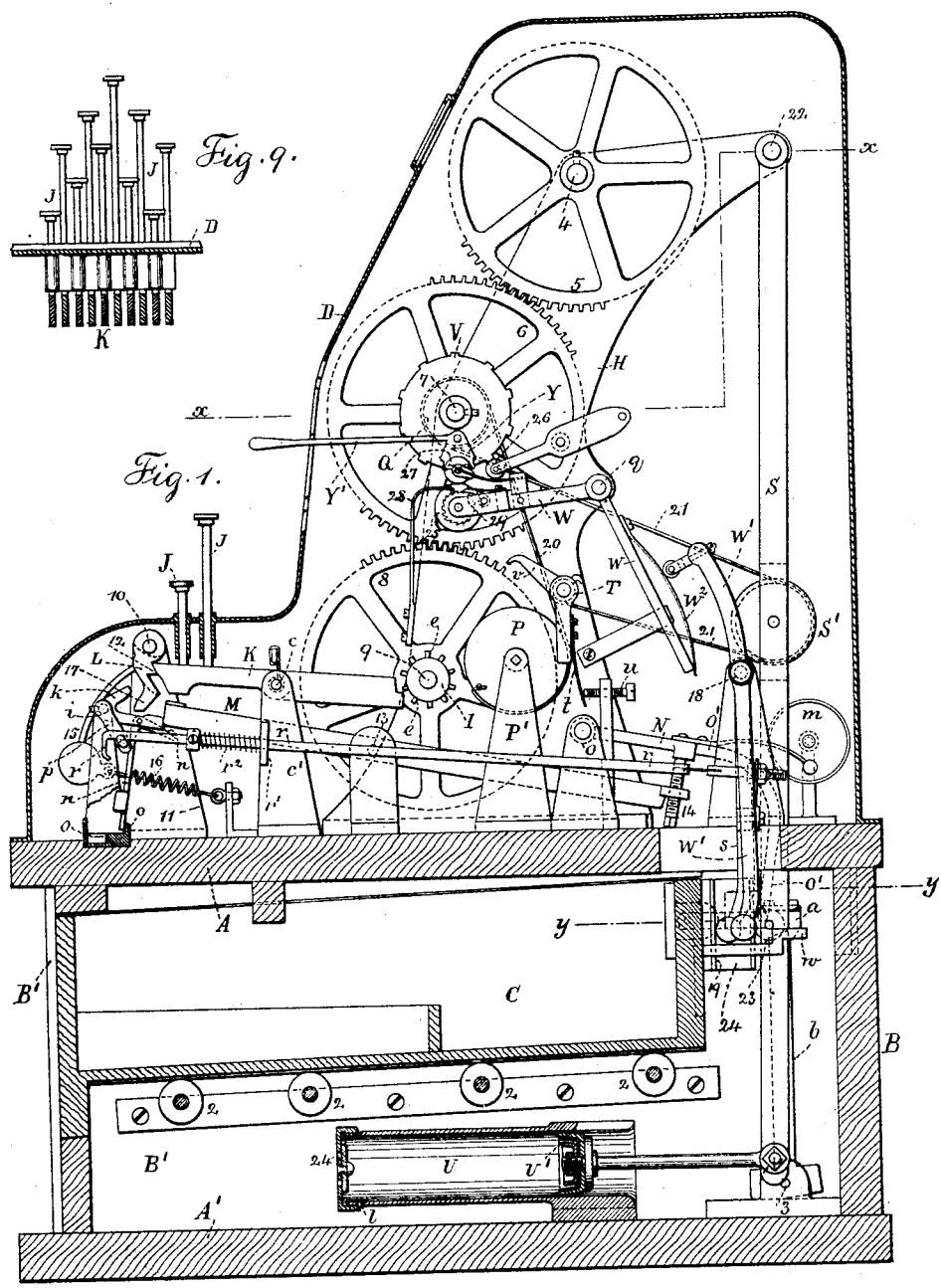
Witnesses:
J. Staib
Chas H. Smith
Inventor:
Edwin A. Dobbins
per Lemuel W. Serrell
atty.

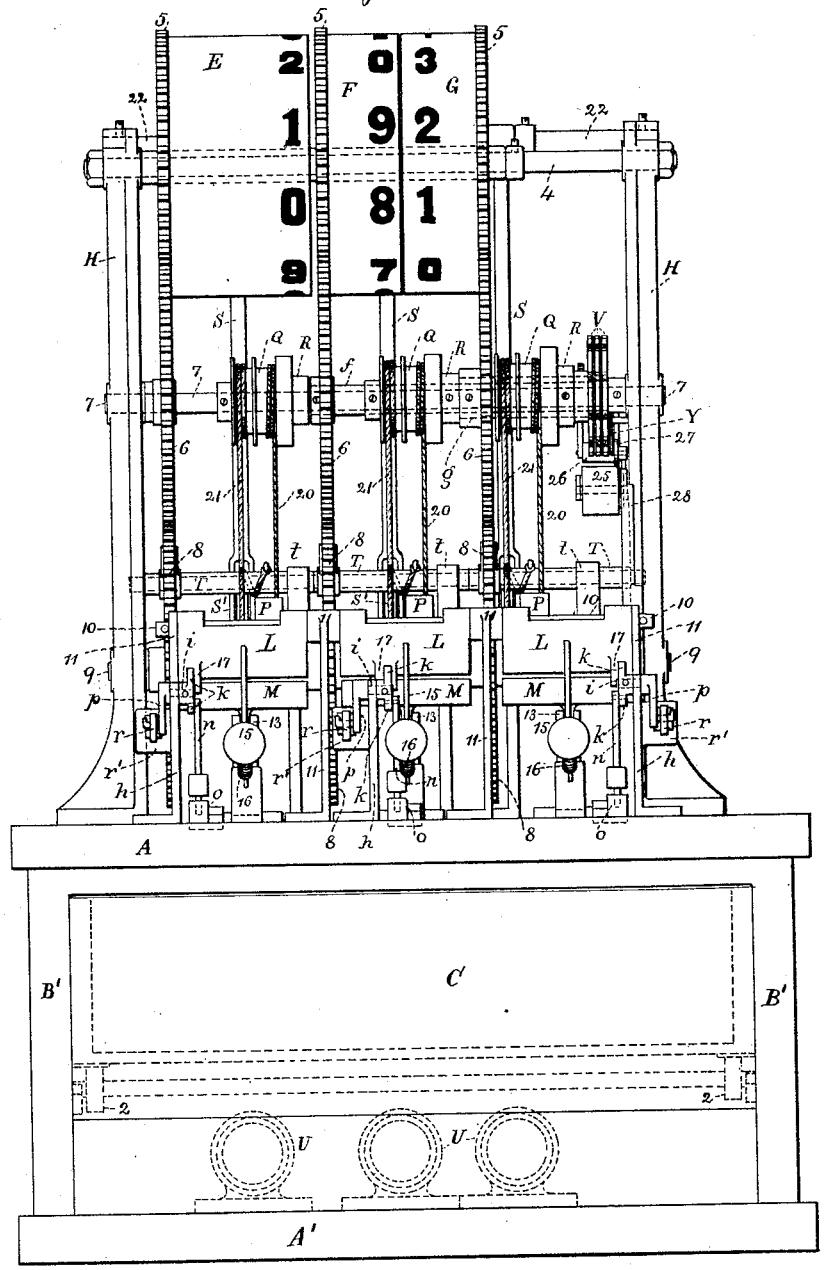

(No Model.) 5 Sheets—Sheet 3.
E. A. DOBBINS.
CASH INDICATOR AND RECORDER.
No. 456,287. Patented July 21, 1891.
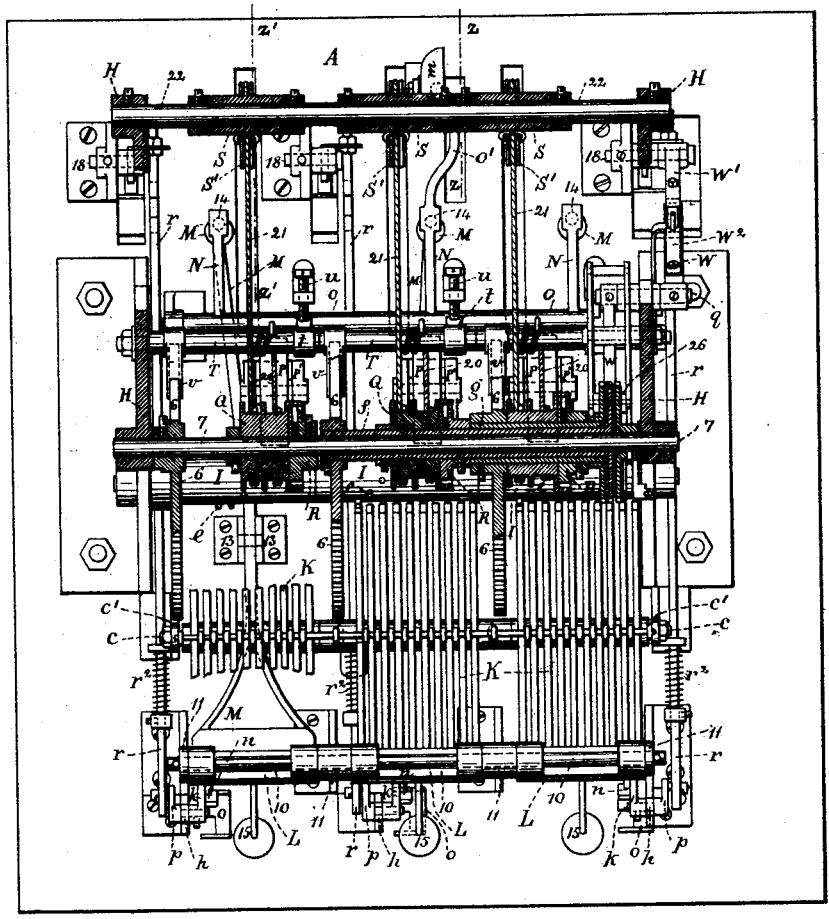

(No Model.) 5 Sheets—Sheet 4.

E. A. DOBBINS.
CASH INDICATOR AND RECORDER.

No. 456,287. Patented July 21, 1891.

Witnesses:
J. Staib
Chas. H. Smith

Inventor:
Edwin A. Dobbins
per Lemuel W. Serrell
Atty (No Model.) 5 Sheets—Sheet 5.
E. A. DOBBINS.
CASH INDICATOR AND RECORDER.
No. 456,287. Patented July 21, 1891.
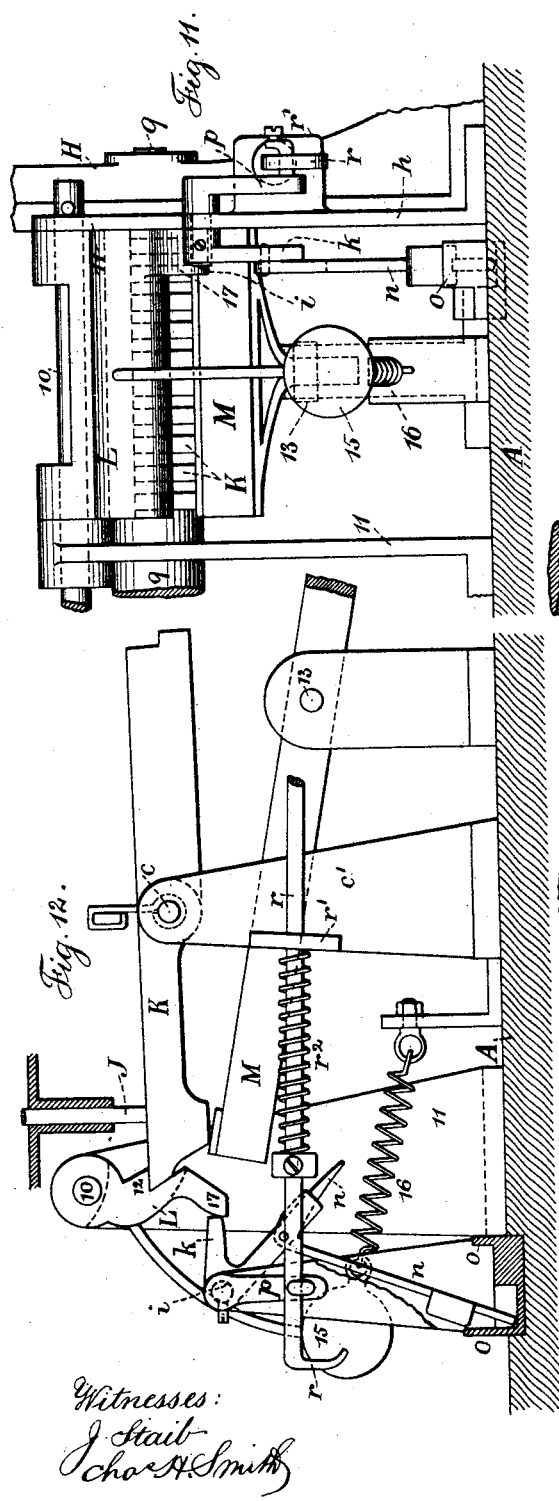
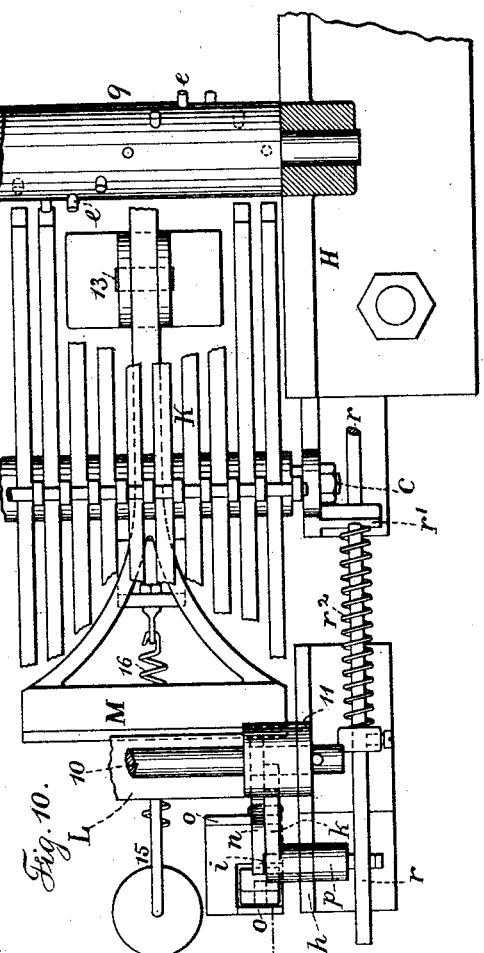
Witnesses:
J. Staib
Chas. H. Smith
Inventor:
Edwin A. Dobbins
per Lemuel W. Serrell atty.
THE NORRIS PETERS CO., PHOTO-LITHO., WASHINGTON, D. C.

UNITED STATES PATENT OFFICE.

EDWIN A. DOBBINS, OF NEW YORK, N. Y.

CASH INDICATOR AND RECORDER.

SPECIFICATION forming part of Letters Patent No. 456,287, dated July 21, 1891.

Application filed January 19, 1891. Serial No. 378,211. (No model.)

*To all whom it may concern:*

Be it known that I, EDWIN A. DOBBINS, a citizen of the United States, residing in the city and State of New York, have invented an Improvement in Cash Indicators and Recorders, of which the following is a specification.

The object of this invention is to indicate the amount of money received or of a sale that is made and at the same time identify in connection with the same transaction the individual conducting it, and also to print a record of such money received or sale made, so that the amount of receipts and sales can be computed at any time afterward; also, to sound a bell or whistle simultaneously with the other acts performed by the machine.

I make use of progressively-revolving number-drums geared to and revolving with shafts, upon each of which is a drum with a spiral row of pins, and the number-levers act as escapements in connection with these pins, so that when a number-lever is depressed it is thrown into the path of the corresponding pin and arrests the pin and the number-drum with the corresponding number exposed to view, and this key-lever and its connection locks the parts so that they cannot turn until another lever is depressed, and in so doing the first lever is liberated and the second key-lever acts as an escapement to stop the revolution of the drum at the proper point, and I provide for automatically winding up the spring mechanism that is employed for turning the number-drums, and this is effected by the opening and shutting of the cash-drawer, and the printing mechanism is brought into action just before the cash-drawer is closed, and the device that holds the cash-drawer in position is so constructed that the drawer has to be pushed inwardly and beyond its normal position, in order to be held in place, thus insuring the entire movements of the apparatus that are actuated by the movement of the drawer.

Figure 5:
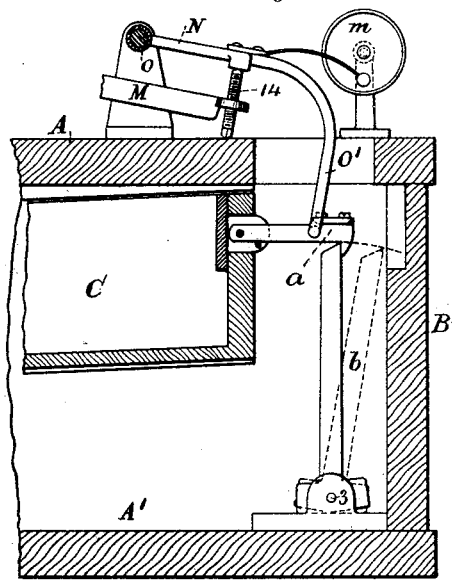
Figure 6:
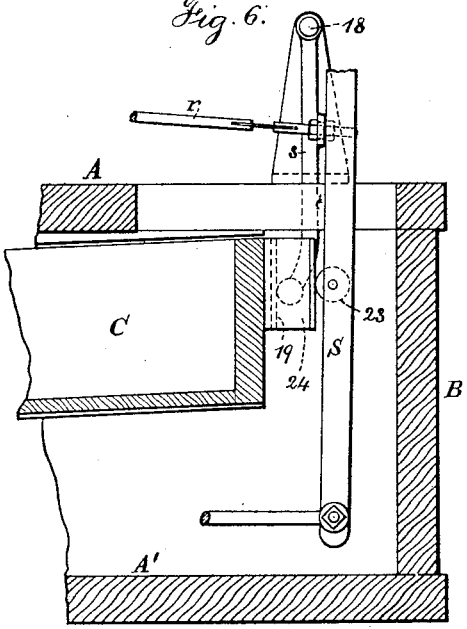
Figure 7:
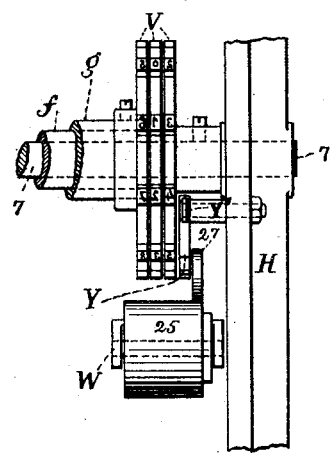
Figure 8:
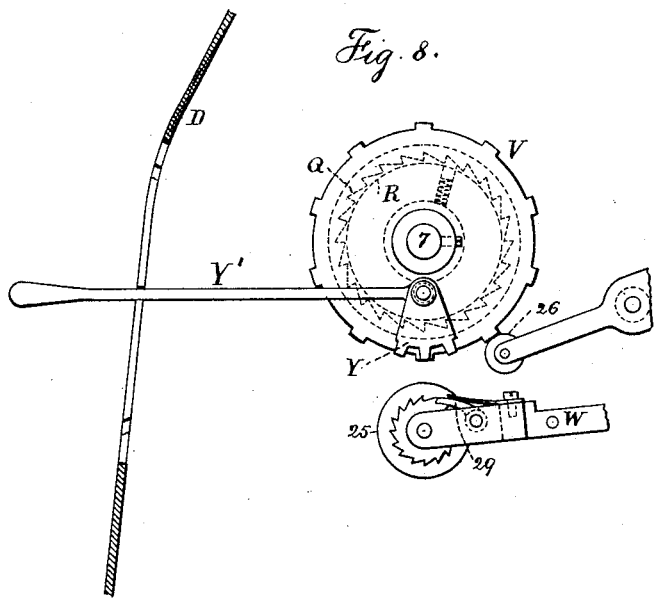

In the drawings, Figure 1 is an elevation of the apparatus and a section of the base and the cash-drawer. Fig. 2 is a front elevation without the inclosing case. Fig. 3 is a sectional plan view at the line $x\ x$, Fig. 1, and Fig. 4 is a sectional plan view of the back end of the cash-drawer near the line $y\ y$. Fig. 5 is a partial section of the base at the line $z\ z$, Figs. 3 and 4. Fig. 6 is a similar section at the line $z'$, Figs. 3 and 4. Fig. 7 is an elevation, in larger size, edgewise of the type-wheels. Fig. 8 is a similar view endwise of the axis of the type-wheels, and Fig. 9 is a diagram showing the relative positions of the finger-pieces. Fig. 10 is a partial plan view, in larger size, showing portions of the key-levers, rocker-frame, and connected parts. Fig. 11 is an elevation of the parts shown in Fig. 10; and Fig. 12 is a diagrammatic side view, the base being in section at $z$, Fig. 10, and one key-lever depressed.

The base of the apparatus is of any suitable size and shape. It is represented with a bottom board A', top board or base A, back B, and sides B', and the cash-drawer C is within the base and preferably fitted to roll upon the rollers 2. The hook $a$ is pivoted to the back end of the cash-drawer C, and there is a latch $b$ pivoted at 3 and having a foot which limits the swinging movement of the latch in either direction, as indicated in Fig. 5; and the ends of the latch and of the hook are inclined, and when the cash-drawer is pushed into place the hook $a$ presses against the upper end of the latch $b$ and the latter swings backward upon the pivot 3 until the foot of the latch arrests its further movement. Then the hook $a$ slides over the latch and catches behind it and the cash-drawer and the hook move forward and the latch $b$ swings upon its pivot until its foot arrests the further movement of the parts. The object in thus providing for the cash-drawer to be pushed in farther than its normal position before it can be latched and secured is to provide for a full and uniform stroke of the winding-levers and at the same time leave them in a free swinging position without contact with the drawer, so that the power of the springs may not be restrained nor the prompt starting of the wheels be interfered with when the key-lever is depressed, and to insure the full movement of the parts hereinafter described.

The whole of the indicating apparatus is to be inclosed in a suitable case resting on the top board or base A and properly secured thereto. This case is indicated at D, and in such case there is to be a window in line with the numbers that are to be observed upon the number-drums E F G. The window is so placed that only one of the figures on each drum-wheel can be seen at a time. The number-drum E is to indicate dollars, the number-drum F dimes, and the number-drum G cents, and, if desired, the apparatus can be extended to contain another drum to indicate ten dollars up to one hundred.

The number-drums E F G are upon a cross-shaft 4, that is supported by the side frames H, which side frames are to be of any suitable character, and each drum is provided with a gear-wheel 5, gearing to a similar wheel 6 upon a shaft 7, and these gear-wheels 6 gear into the wheels 8 upon the stationary cross-shaft 9, and these gears 5, 6, and 8 are to be the same size, so that they will rotate in unison, and connected to each gear-wheel 8 is a pin-drum I, around which there are ten pins at equal distances apart peripherally and placed at equal distances apart longitudinally, so as to form a single spiral or screw shape around the pin-drum, and there are three sets of key-levers K, one set for each pin-drum, and the pins and the levers are in line with each other, and these key-levers are supported by and moved upon the pivot pin or axis $c$, that is supported by suitable brackets $c'$ upon the base-plate A.

As all the key-levers are alike and their mode of operation corresponds, it is only necessary to describe one of such key-levers and the parts that act therewith, and I remark that in Fig. 3 the key-levers in one section are partly broken off and removed to show the parts that are beneath the same.

The end of each key-lever adjacent to its pin $e$ is formed with a step or offset, the top edge of which is preferably in the same plane with a line drawn horizontally through the center of the pivot on which the key-lever works, which in the normal position of the key represented in Fig. 1 is out of the path of the end of the pin $e$. Hence the pin-drum and the wheels can revolve freely until one of the pins is arrested by the key-lever that is depressed, and the numbers are so applied upon the number-drums E F G that when one key is depressed the proper number upon the drum will be opposite the window at the time the pin is stopped by its key-lever, and when the key-lever is raised the parts can resume their rotation until stopped by another key-lever, and it is to be borne in mind that a spring is made use of to rotate the number-drums and the gear-wheels therewith connected and the pin-drums, and this spring is wound up from time to time when the drawer is pushed in, so that the power employed to rotate the number-drums and gearing is constantly renewed.

The keys are actuated by any suitable range of finger-pieces projecting above the case-inclosure D. I have represented such finger-pieces at J, and they should be marked with the numbers corresponding to the numbers upon the respective drums E F G, and they can be arranged in two banks at successively higher elevations to the middle, as seen in Fig. 9, to be convenient of access. The rod 10 passes across above the front ends of the key-levers K, and said rod is supported by the brackets 11, and it forms the pivot upon which the locking-tumblers L swing. There is a locking-tumbler for each set of key-levers and the locking-tumblers are similar, and the ends of the key-levers adjacent to the locking-tumblers are beveled, as shown in Fig. 1, and the faces of the locking-tumblers adjacent to the ends of the key-levers are grooved horizontally, with the beveled rib 12 between the two grooves, and this beveled rib forms a latch.

In the normal positions the ends of the key-levers are above this beveled rib, and when one key-lever is depressed its end swings back the locking-tumbler, and the locking-tumbler then moves in the opposite direction, and the bevel-rib 12 passes above the depressed key and forms a latch to hold down such depressed key, and as there is not any means of access to the locking-tumbler except by one of the key-levers the depressed key-lever remains in its depressed and latched condition until another key-lever is depressed to swing back the locking-tumbler and liberate the first key-lever, which rises by the superior weight of the back end of the key-lever and by the action of the pin-drum, and the second depressed key-lever is held down until another key is depressed. Hence it will be apparent that the number-drums E F G remain in a fixed position between one key-depression and the next, and the number-drum that is allowed to turn by the depression of one key unlatching the depressed key, as described, will be arrested by the depressed key when its pin $e$ comes in contact with said key and the proper number upon the drum will be exposed at the window and so remain. This is the case with all of the number-drums, and hence if the proper dime-number is exposed it is only necessary to depress one of the cent-keys to bring the drum G around to position, and in the normal position the drum E will remain at naught (0) when the sale is less than one dollar, and this drum is held in that position by the key with the naught (0) marked upon it remaining depressed, and this condition can be availed of with either of the drums E, F, or G, it only being necessary to act upon the other drums when the proper number of either of the drums is exposed at the window.

Beneath each group of key-levers is a rocker-frame M, pivoted at 13, and the front end of each rocker-frame is adjacent to the under side of the key-levers, so that when either key-lever is depressed this rocker-frame M is swung downwardly at the front end. At the rear end of each rocker-frame is a lifter-screw 14, acting against an arm N on a rock-shaft O, and there is a pendent finger O' passing from the rock-shaft down through the base A and having a projection at the lower end beneath the flange of the hook $a$, and there are as many arms N as there are rocker-frames M, so that when either rocker-frame M is depressed sufficiently to release a previously-depressed key-lever, thus permitting the wheels to revolve to a new position, the rock-shaft O is moved and the hook $a$ lifted by the pendent finger O' to unlatch the drawer and allow the same to open by rolling upon the rollers 2, the bottom of the drawer having an inclination, so that such drawer opens partly by gravity when unhooked. When one key is depressed, it acts upon the rocker-lever, and the key must be fully depressed, otherwise the drawer will not open, and this movement is always more than sufficient to unlatch the previous key that had been held down by the tumbler, so that such key will be restored to a normal position.

In connection with the rocking frame of each range of key-levers and the swinging locking-tumblers L, I make use of a tripping-foot so arranged that when any key-lever is depressed far enough to cause the rocking frame to perform its duty of releasing the drawer a second key-lever cannot be depressed until after the drawer has been closed and latched. In carrying out this feature the locking-tumbler L is provided with a weighted arm 15 and a spring 16, if necessary, which tend to keep the rib 12 toward the beveled ends of the keys.

Upon suitable standards $h$ an axis $i$ is supported, and upon this axis is a lock $k$, having two arms, one of which is adjacent to the arm 17 on the locking-tumbler L, and the other arm carries a tripping-foot $n$, that is pivoted to said arm, and this tripping-foot is in the form of the bent lever, the nearly horizontal arm of which passes below the front end of the rocker-frame M, and the nearly vertical arm of the tripping-foot rests at its lower end upon the flanged stop $o$. The parts in their normal condition occupy the positions shown in Fig. 1, and when one key is depressed it swings the rocker-frame M, unlatching the drawer, and simultaneously the rocker-frame M strikes the horizontal arm of the tripping-foot, and swinging the same upon its pivot upon the lock the lower end of the tripping-foot is moved away from the stop-flange $o$ and over a recess in the base A, so that the lock $k$ swings upon its axis $i$, and one arm of the lock $k$ comes nearly horizontally in front of the arm 17 upon the locking-tumbler L. Hence this lock $k$ will hold said locking-tumbler and prevent any movement of any other key until the lock $k$ is swung back out of the way of the arm 17. This operation is effected by a crank-arm $p$ upon the axis $i$, which is moved, as next described, by the action of the cash-drawer as it is pushed fully into its place, and when this crank-arm $p$ is drawn back the arm of the lock $k$ is swung upwardly from the arm 17 and the tripping-foot $n$ is lifted bodily by the lock, and the lower end of the tripping-foot hanging below the pivotal connection of the tripping-foot to the lock causes such tripping-foot to return to its normal position. (Shown in Fig. 1.)

Any suitable connection may be made use of between the crank-arms $p$ and the cash-drawer, whereby the backward movement of the cash-drawer may draw the crank-arm $p$ backwardly; but I prefer to use the hooked rod $r$, that slides through a support $r'$ and is projected forwardly by a spring $r^2$, and below the stationary axis 18 is a hanging lever $s$, to which the back end of the hooked rod $r$ is adjustably connected, preferably by the rod passing through an opening in the hanging lever and having a nut upon the screwed rear end of the hooked rod $r$, and the back surface of the drawer acts against the lower end of this hanging lever $s$, and there is preferably a shield or metal plate 19 upon the drawer to prevent the same being worn by contact therewith of the lower end of this hanging lever.

As before mentioned, the drawer has to be pushed in beyond its normal position to be latched, and in so doing the hooked rod $r$ is moved the proper distance to restore the tripping-foot to its normal position, and as the drawer comes outwardly to its normal position the lower end of the hanging lever $s$ can move forward by the action of the spring $r^2$ sufficiently for the hooked end of the rod $r$ to be free of the crank-pin upon the arm $p$. Hence the parts are in the proper position for allowing the lock $k$ and tripping-foot to be free for moving the next time one of the keys is depressed.

It is to be understood that a lock, tripping-foot, hooked rod, hanging lever, and their connecting parts are provided with each section of the key-levers.

I will now describe the means made use of for applying spring-power to the number-drums and pin-drums for rotating the same and the means for winding up the springs progressively and automatically.

A spring-barrel P is provided for each set of gearing, and the axis of the barrel is supported and held from rotating by any suitable device, such as the brackets P', and from the spring-barrel passes a cord or band 20 to the pulley Q, surrounding the shaft 7. This pulley is loose; but adjacent to it is a disk R and ratchet-and-pawl connection between the disk and pulley, such ratchet-and-pawl connection being of ordinary character, similar to that employed between the axle and hub in mowing-machine wheels, and each disk R is connected with one of the wheels 6, either by both being fastened directly to the shaft 7 or by tubular sleeves around such shaft 7, which tubular sleeves are represented in Fig. 3, and are for a purpose hereinafter described. Hence as the cord or band 21 is drawn off the pulley Q the cord or band 20 is wound on the same and the spring in the barrel P is wound up, and the ratchet of the pulley runs over the pawl on the disk R, while the gear-wheels remain stationary; but when the cord or band 21 is slackened the spring in the barrel P, acting through the cord or band 20, rotates the pulley Q and the disk R and the gear-wheels therewith connected. The winding-levers S are pivoted at 22 upon the frame, and they pass down through the base A and are acted upon by the drawer as it is pushed in, there being rollers 23 in the levers S, against which the projections 24 upon the drawer act, and upon each winding-lever is a pulley S′, around which the band 21 passes, and the lower end of the band 21 is wound around and then fastened to the rocker-sleeve T upon a stationary shaft, there being a rocker-sleeve to each key-section, and upon the rocker-sleeve is an arm and spring $t$ in contact with an adjustable screw $u$, and upon the rocker-sleeve is a pawl $v$, adjacent to the gear-wheel 8. The screw $u$ is so adjusted against the spring $t$ that the pawl $v$ in its normal position is out of contact with the wheel 8, and it is to be understood that as the drawer is moved forward and the winding-lever S swings forward at its lower end the spring-barrel acts to rotate the gearing, and at the same time tends to wind the cord 21 upon the pulley Q, and when the reverse motion takes place and the drawer is pushed into its position it acts upon the winding-lever S, and by pulling upon the cord 21 the pawl $v$ is first thrown down into contact with the wheel 8, holding the train of gearing, and the further movements draw the cord 21 off of the pulley Q, rotating the same and causing its ratchet-teeth to move over the spring-pawl of the disk R, and thus take up the proper number of teeth upon that ratchet-disk and simultaneously winding up the cord 20 upon the pulley Q and applying the necessary tension to the spring in the barrel P. When the spring-power is released, it is necessary to control the movement of the wheels, so that too great momentum will not be attained, especially when the wheels have a considerable part of an entire revolution to make. With that end in view I make use of the cushioning-cylinder U, in which is a piston U′, preferably provided with a cup-leather and a rod extending to the lower end of the winding-lever, there being one of these cushioning-cylinders to each winding-lever, and the piston acting against the air confined in the cylinder regulates the speed of movement in opening the drawer and in turning the wheels and number-drums, so that concussion is prevented. It is, however, advantageous to slot the cylinder U near the open end, so that the piston may not pass out of the cylinder when the cash-drawer is pushed to its extreme backward movement, and the air will not be cushioned until after the parts return to the normal position, and there should be an air-valve at 24 to admit air freely into the cushioning-cylinder to prevent resistance as the cash-drawer is pushed back to place, and an opening is provided in the cylinder which may have an adjusting-screw to regulate the resistance and speed of movement of the piston and parts connected therewith.

The receipts are registered by a printing operation, and with this object in view as many type-wheels V are provided as there are number-drums, and one of these type-wheels is connected with the shaft 7, another with the sleeve $f$, surrounding that shaft, and the third with an exterior sleeve $g$, as indicated in Fig. 3, so that each type-wheel will be united to its proper gear-wheel to turn with the allotted number-drum, and there is an impression-roller 25 upon a lever W, pivoted at $q$, and having an arm W′, which impression-roller is actuated at the proper time, and there is an inking-roll 26 and a contact-wheel 27, that presses the strip of paper against the impression-roll 25 and causes the paper to move when the roll is turned, and there is a stationary pawl 28 and a pawl 29 on the lever W, that turn the impression-roll progressively, as in printing-telegraphs, and the impression-roll 25 hangs out of contact with the type-wheels until the lever W is actuated, and this is effected immediately before the drawer is closed by the lever W′, pivoted on the stud or axis 18, and having a roller at the lower end adjacent to a bracket-piece $w$ on the drawer C, the outer end of this bracket-piece being higher than the inner portion, so that as the drawer is pushed in the bracket-piece $w$ pushes the lower end of the lever W′ backwardly to give motion to the lever W and impression-roll, and when the drawer is fully pressed in the bracket-piece $w$ has passed beyond the lower end of the lever W′ and the latter hangs freely, so that a second impression cannot be made by a slight movement of the drawer, and it is preferable to place the spring $W^2$ upon the lever W at the point of contact of the lever W′, so that the sudden movement of the drawer in pushing it in will not be liable to injure any of the parts.

A bell of any suitable character may be provided, so that it may be struck to indicate the operative condition of the apparatus and call the attention of the purchaser to the register. I have shown a bell at $m$, and a clapper to strike the same upon a spring connected with the finger O′ upon the rock-shaft O, so that the bell will be struck each time the drawer is unlatched.

There may be a small hole $l$ in each of the air-cylinders U to form a whistle as the drawer is opened and the piston passes into the cylinder, thereby indicating that the parts of the apparatus are receiving their proper movements.

This instrument is available in keeping an account or register of the payments or transactions indicated by the dials each time the drawer is closed.

In addition to recording sales this machine will indicate on the tape near the figures representing the sale, by a character selected for the purpose, the salesman to whose credit the transaction belongs. With this object in view I place adjacent to one of the type-wheels V a marker Y, having as many letters, numbers, or other characters as there may be clerks or partners using the machine, there being a letter, number, or mark allotted to each person, and this marker is pivoted so that its face is adjacent to the types at the place where the printing is performed, and this marker is to be turned around to bring one mark or the other into position to be printed, according to who the person is that is making use of the machine, and to enable such person to change the marker conveniently to his own mark the handle Y' is provided, or other similar device, such handle projecting through the case or inclosure D, which may be slotted for the reception of such handle, and provided with notches by which the handle may be held in any position to which it may be turned in bringing the desired mark or number into position to be printed from. These parts are shown separately in Figs. 7 and 8 in larger size, and may also be used for indicating the class of goods to be valued in taking stock, the characters being used arbitrarily to indicate the various lines or classes of merchandise comprising the contents of the store.

I claim as my invention—

1. The combination, with a cash-drawer and ranges of keys, of number-drums and pin-drums, gearing for connecting the same, and springs for revolving the drums when a pin is liberated from a key and for stopping such drum by the pin against a key, substantially as set forth.

2. The combination, with a pin and a number-drum, of connecting-gearing and mechanism for rotating the drums progressively, and ranges of keys acting with the pins to stop the number-drums in position to correspond with the key depressed, substantially as set forth.

3. The combination, with the number-drums and ranges of keys having beveled ends, of the locking-tumblers pivoted adjacent to the beveled ends of the keys and moved backwardly by the depression of any one key, there being a rib on the locking-tumbler forming a latch to hold down the beveled end of the key that is depressed until liberated by the downward movement of the next key, substantially as set forth.

4. The combination, with the number-drums and pin-drums, their connecting-gearing, and actuating-spring, of ranges of key-levers, locking-tumblers acting upon the beveled ends of the key-levers, a cash-drawer, rocker-frames beneath the keys, a hook and latch for holding the cash-drawer, and a connection from the rocker-frames to the hook for unlatching the cash-drawer when a key is depressed, substantially as set forth.

5. The combination, with the key-levers, of the locking-tumbler, lock and tripping-foot connected together and acting to hold the locking-tumbler, the rocker-frame for acting upon the foot and bringing the lock into action, and the hooked rod actuated by the cash-drawer for restoring the lock and tripping-foot to their normal positions when the cash-drawer has been closed, substantially as set forth.

6. The combination, with the cash-drawer and its hook, of a pivoted latch having a limited motion and with which the hook on the cash-drawer engages when the drawer is pushed in to the full extent, a range of keys and indicating mechanism, and a connection therefrom to the cash-drawer, whereby the parts that are moved by the cash-drawer receive a full motion before the latch engages the hook and then the cash-drawer returns to its normal position to liberate the parts that had received motion from such cash-drawer in closing the same, substantially as set forth.

7. The combination, with the key-levers and pin-drums, of number-drums, gearing for connecting the same, spring-barrels for rotating the drums and gearing when the pins are liberated from the keys, a lever and connection to each spring-barrel for moving the lever as the spring unwinds, and a cash-drawer to act upon such levers and restore them to a normal position and wind up the springs, substantially as set forth.

8. The combination, with the pin-drums and number-drums, and the connecting-gearing, of ranges of key-levers for arresting the movement of the pin-drums, springs for giving motion to the drums and gearing, a winding-lever, receiving its motion from the cash-drawer, a ratchet and pawl, and mechanism extending from the winding-lever to the ratchet-and-pawl mechanism for winding up the spring-barrels progressively, substantially as set forth.

9. The combination, with the pin-drums and number-drums and the connecting gearing, of key-levers acting against the pins to arrest the movements of the parts, spring-barrels and connecting cords or bands to the gearing, a winding-lever acted upon by the closing of the drawer, a pulley on the winding-lever, a pawl, a cord passing from the axis of the pawl around the pulley, and a ratchet-and-pawl mechanism to which the cord is connected, whereby the winding up of the spring is performed automatically and the pawl brought into action for holding the parts during the winding operation, substantially as set forth.

10. The combination, with number-drums and pin-drums and the ranges of key-levers, of type-wheels and tubular connections or sleeves to the gearing, whereby the type-wheels are turned in harmony with the respective number-drums, and a means for supplying a strip of paper and for printing upon the same as the cash-drawer is closed, substantially as set forth.

11. The combination, with the cash-drawer, of a bracket-piece thereon, number-drums and type-wheels, an impression-roll, a lever for actuating the same, and a lever between the impression-roll and the bracket-piece that is brought into action by the bracket-piece on closing the drawer to print and then allow the impression-roll to drop, substantially as set forth.

12. The combination, with the number-drums and connecting-gearing, of spring-barrels and connections for actuating the number-drums, winding-levers and their connections for winding the springs automatically, cushioning-cylinders and their pistons connected with the winding-levers for controlling the speed of movement given to the parts by the springs, and a cash-drawer for giving motion to the winding-levers, substantially as set forth.

13. The combination, with the number-drums, pin-drums, and connected gearing, of type-wheels and tubular shafts or sleeves connecting the type-wheels, respectively, with the number-drums, an impression-roll for printing from the type-wheels, a cash-drawer, and levers intervening between the same and the impression-roll, substantially as set forth.

14. The combination, with the number-drums, pin-drums, and ranges of key-levers, of type-wheels connected to the respective drums, an impression-roll for printing from the type-wheels, and a marker adapted to being moved to bring different marks into position for printing at the same time with the impression from the type-wheels, substantially as set forth.

15. The combination, with the cash-drawer, the number-drums, and key-levers, of a latch for holding the drawer, a finger for unlatching the drawer, a bell acted upon by a spring-hammer on the finger, and the rocker-frame below the key-levers and by which the finger is moved, substantially as set forth.

Signed by me this 15th day of January, 1891.

EDWIN A. DOBBINS.

Witnesses:
GEO. T. PINCKNEY,
HAROLD SERRELL.